United States Patent [19]

Summers

[11] Patent Number: 4,534,541

[45] Date of Patent: Aug. 13, 1985

[54] VALVE INCORPORATING DEFORMABLE VALVE BODY

[75] Inventor: David P. Summers, Houston, Tex.

[73] Assignee: Forerank, Inc., Houston, Tex.

[21] Appl. No.: 563,120

[22] Filed: Dec. 19, 1983

[51] Int. Cl.[4] ............................. F16K 7/02; F16K 7/18
[52] U.S. Cl. .................................... 251/331; 251/333; 251/DIG. 2
[58] Field of Search ................. 251/331; 251/DIG. 2, 251/333

[56] References Cited

U.S. PATENT DOCUMENTS

| 2,343,584 | 3/1944 | Scheele | 251/331 |
| 2,604,297 | 7/1952 | Winstead | 251/331 X |
| 2,681,752 | 6/1954 | Jarrett et al. | 251/331 X |
| 3,768,508 | 10/1973 | Schulte | 251/331 X |
| 4,102,342 | 7/1978 | Akiyama et al. | 251/DIG. 2 |

Primary Examiner—Arnold Rosenthal
Attorney, Agent, or Firm—Gunn, Lee & Jackson

[57] ABSTRACT

A valve apparatus incorporating a deformable valve and valve seat is disclosed. The valve apparatus includes two premolded spheroid valve elements fabricated of resilient material deformable to preselected configurations. The valve elements are secured to pipe ends extending within a fluid housing. The valve deforms upon axial movement of the pipe end and is shiftable relative to the valve seat for opening and closing the valve apparatus.

7 Claims, 5 Drawing Figures

VALVE INCORPORATING DEFORMABLE VALVE BODY

BACKGROUND OF THE DISCLOSURE

This application is directed to a valve apparatus, particularly, a valve apparatus including a deformable valve and valve seat within a fluid housing.

Valves are well known in the prior art and are used extensively to close or modify the passage through a pipe, outlet, inlet, or the like, to control the flow of liquids, gases, and other fluids therethrough. Numerous types of valves are available in varying sizes. Some valves are relatively simple while others are very complex. However, all valves have a valve element and a valve seat. The valve element may be a disk, ball, needle, or other configuration. The valve element moves toward and engages a valve seat for closing the fluid passage. To accomplish this, a valve must have a number of mechanical elements permitting movement of the valve element relative to the valve seat. For example, a globe valve includes a wheel, spindle, stuffing nut, disk, and valve seat. Rotation of the wheel advances the spindle through the stuffing nut and thereby advances the disk which is mounted to the end of the spindle toward the valve seat for engagement therewith. These types of valves are particularly useful for controlling the flow of pressurized fluid through a pipe.

Valves are used in many different environments and not all uses require high pressure valves. The present invention is directed to a valve for use in low pressure environments. For example, this valve may be used in a scientific laboratory in line with equipment requiring periodic samples of fluid from a fluid reservoir. The valve apparatus is simple to use requiring only slight axial movement of the fluid conduit to fully open and close the valve.

It is therefore an object of this invention to provide a valve apparatus for use in a low pressure environment incorporating a deformable valve element for engagement with a deformable valve seat.

It is another object of the invention to provide a valve apparatus enabling a user to fully open or fully close the valve apparatus in a single motion.

SUMMARY OF THE INVENTION

The valve apparatus of the present invention comprises a fluid chamber or housing enclosing the valve elements. The housing is partitioned by a partition wall defining two chambers. The partition wall supports a valve element and fluid conduit extending therethrough. The valve seat is mounted on the end of a segment of the fluid conduit which extends through the opposite end of the valve housing. The valve and valve seat are fabricated of deformable resilient material which deforms to open and close the valve upon axial movement of the fluid conduit.

BRIEF DESCRIPTION OF THE DRAWING

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Figure 1:
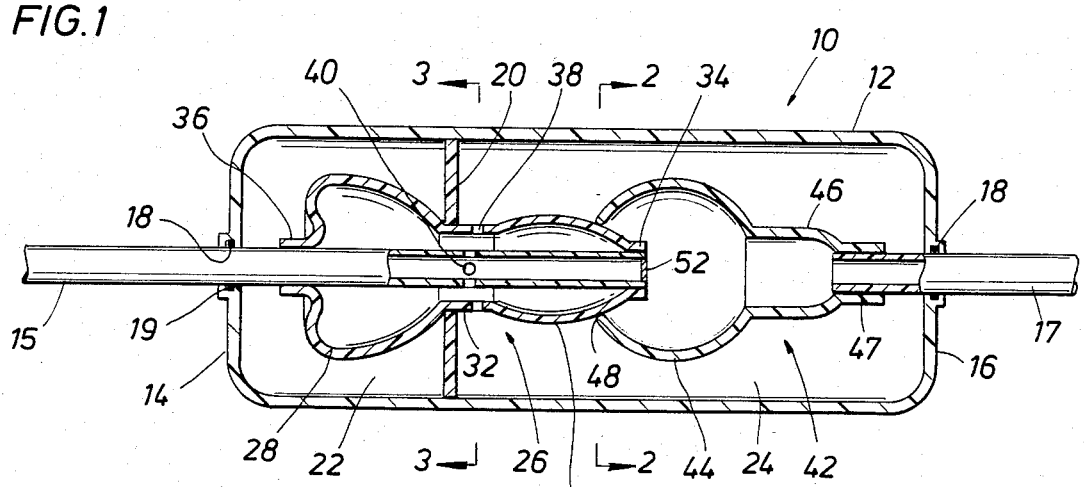
FIG. 1 is a sectional view of the valve apparatus of the invention.

Referring first to FIG. 1, the valve apparatus of the invention is generally identified by the reference numeral 10. The apparatus 10 includes a valve housing 12 which encloses the valve elements and is closed at each end thereof. The size and shape of the valve housing 12 is determined by the intended use of the apparatus and scale factors associated therewith. For illustrative purposes only, the valve housing 12 is shown in FIG. 1 as cylindrical in shape closed at each thereof by ends 14 and 16. Openings defined by circumferential grooves 19 are provided in the ends 14 and 16 for receiving pipe segments 15 and 17, respectively. The pipes 15 and 17 are fabricated of rubber or other suitable material. The openings in the ends 14 and 16 are sized to accommodate the pipes 15 and 17 and engage the outer surface of the pipes. Seals 18 are located in the grooves 19 of the ends 14 and 16 providing a fluid tight seal with the pipes 15 and 17. The housing 12 is divided by a partition wall dividing the housing into two chambers 22 and 24. The valve 26 is supported by the partition wall 20 as shown.

The valve 26 comprises two spheroid portions 28 and 30 separated by a collar 32. The valve 26 is journalled about the pipe 15 and secured to the end thereof at 34. The spheroid 28 includes a sleeve 36 at one end defining an opening for receiving the pipe 15 therethrough and sealingly engaging the outer surface of the pipe 15.

The valve 26 partially extends through the partition 20 as shown. A hole is centrally located in the partition 20 and sized to securely engage the collar 32 of the valve 26. The collar 32 is anchored to the partition 20 and does not move relative thereto in the normal operation of the valve. A plurality of holes 38 are spaced about the collar 32 permitting fluid to pass therethrough. The holes 38 are aligned with holes 40 in the pipe 15 when the valve is in the open position shown in FIG. 1.

The valve seat 42 comprises a spheroid 44 and sleeve 46 secured to the end of pipe 17 at 47. The spheroid 44 is truncated at one end forming a valve seat surface 48.

The valve 26 and valve seat 42 are fabricated of polymers or copolymers of ethylene with average molecular weight of about 20,000. PVC, thermoplastic rubber, and latex are also suitable materials. The spheroids 28, 30 and 44 are premolded to a specific configuration, however, the structural material is deformable permitting the spheroids to change shape upon axial movement of the pipes 15 and 17. However, the spheroids return to the premolded shape upon axial movement of the pipes 15 and 17 in the opposite direction. The reforming characteristic of the material is referred to as "memory" in that the material recalls and resumes its former shape.

Figure 2:
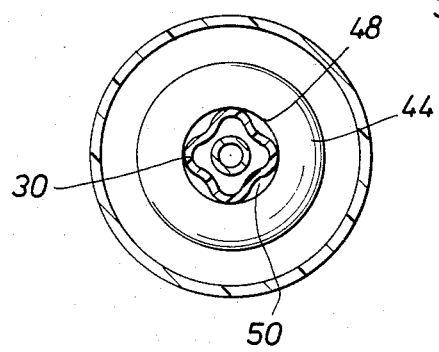
FIG. 2 is a sectional view of the apparatus of the invention taken along line 2—2 of FIG. 1 showing the deformed profile of the valve element axially shifted to the open position.
Figure 3:
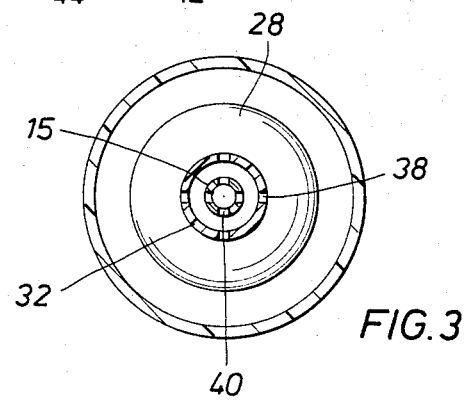
FIG. 3 is a sectional view of the apparatus of the invention taken along line 3—3 of FIG. 1 showing the fluid apertures in the aligned fluid apertures of the valve in the open position.

In the deformed or stretched configuration of the valve 26 shown in FIG. 1, the valve apparatus is open to facilitate the passage of fluids. The valve 26 is deformed by movement of the pipe 15 toward the valve seat 42. The valve 26 is anchored by the partition wall 20 about the collar 32 so that upon inward movement of the pipe 15 the spheroid 30 is stretched and assumes the fluted profile best shown in FIG. 2. The flutes define channels 50 for the passage of fluid through the apparatus. In FIG. 1, fluid flows from left to right. Pipe 15 is plugged at 52. Fluid flowing through the pipe 15 exits through holes 40 into the valve 26 and into the chamber 24 through the holes 38 of the collar 32. Alignment of the holes 38 and 40 is best shown in FIG. 3.

Figure 4:
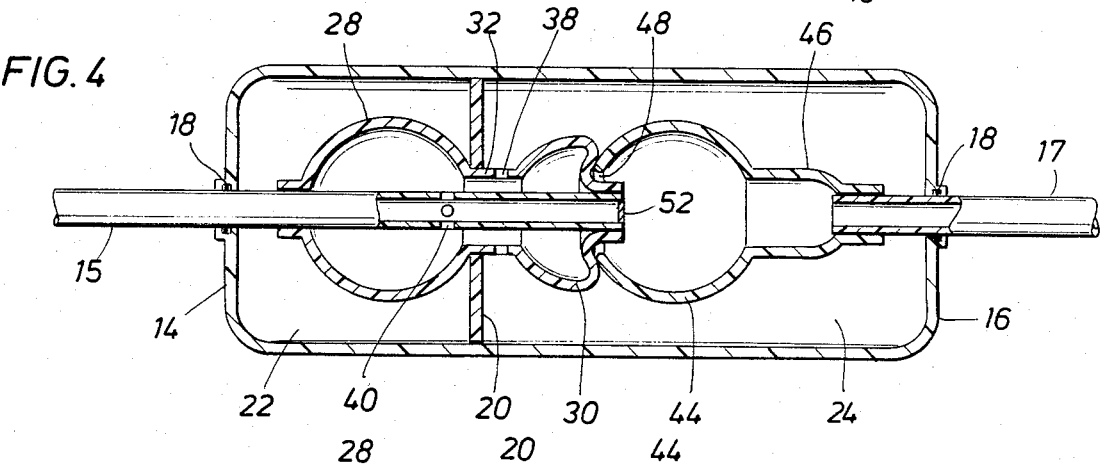
FIG. 4 is a sectional view of the apparatus of the invention in the closed position.

Referring now to FIG. 4, the valve 10 is shown in the closed position. It will be observed that the spheroid 30 is premolded to include an inwardly collapsed portion so that the forward portion of the spheroid portion 30 folds over the seating surface 48 hermetically sealing about the valve seat 42.

Figure 5:
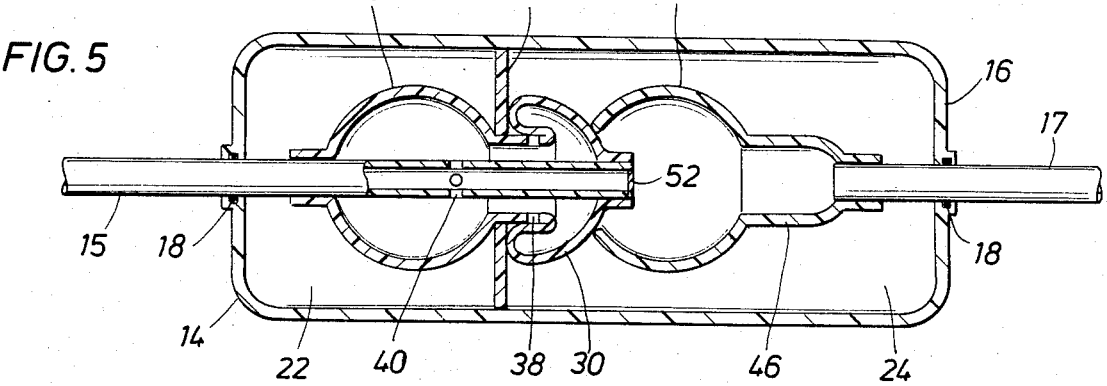
FIG. 5 is a sectional view of the apparatus of the invention showing an alternate sealing embodiment.

In FIG. 5, an alternate seating embodiment is shown. In some instances, it may be desirable to seal the holes 38 in the collar 32. To effect a bidirection seal as shown in FIG. 5, the pipe 17 is shifted inwardly into the valve housing 12 forcing the spheroid 30 to invert, positively and hermetically sealing the holes 38. The seal with the valve seat 44 is maintained, thus simultaneously sealing the inlet and outlet openings.

The operation of the valve apparatus 10 is best described by referring to FIGS. 1 and 4. In FIG. 4, the valve apparatus 10 is in the closed position. Pipe 15 is the inlet and pipe 17 is the outlet. Pipe 15 is connected to a fluid reservoir which may be liquid or gas. The pipe 15 is closed at its outlet end by a plug 52. The flow of fluid into the valve element 26 is not restricted. For example, the pipe 15 may be connected to a large reservoir of liquid sample which requires periodic injection into a test instrument. The liquid sample is not pressurized and freely flows to the valve apparatus 10 under the force of gravity. The fluid enters the valve 26 through the holes 40 in the pipe 15. A quantity of the fluid sample collects in the valve 26 filling the spheroids 28 and 30. Fluid flowing into the valve 26 exits through the holes 38 in the collar 32 filling the chamber 24. If the valve apparatus 10 is closed for a sufficient period of time, the chamber 24 is completely filled with fluid and static condition before the fluid sample is established.

In FIG. 1, the valve apparatus 10 is shown in the full open position which is accomplished by a single, quick movement of the pipe 15 inwardly into the housing 12. Axial movement of the pipe 15 elongates or stretches the spheroid 30 causing the wall of the spheroid 30 to collapse forming flutes or channels as best shown in FIG. 2. The fluid collected in the chamber 24 instantly flows through the channels 50 and out through the pipe 17. Flow continues through the apparatus until the pipe 15 is axially moved in the opposite direction permitting the spheroid 30 to return to its premolded configuration and seat against the valve seat 42.

The foregoing is directed to the preferred embodiments of the present invention, other and further embodiments of the invention may be devised without departing from the basic concept thereof, and the scope thereof is determined by the claims which follow.

What is claimed is:

1. A valve apparatus comprising:
   (a) a valve housing;
   (b) a deformable valve body supported within said valve housing oppositely facing a valve seat for sealing engagement therewith, said valve body including first and second premolded spheroids joined by a connecting collar;
   (c) an inlet pipe extending into said valve body, said valve body being mounted about said inlet pipe and having a forward end attached about a leading end of said inlet pipe;
   (d) an outlet pipe connected to said valve seat;
   (e) a partition wall dividing said valve housing into two chambers, one of said chambers being a fluid chamber, said valve body extending through a hole formed in said partition wall and sealingly engaged by said partition wall about said connecting collar; and
   (f) opening means in said valve body for permitting fluid flowing through said inlet pipe to enter said fluid chamber.

2. The apparatus of claim 1 wherein said opening means comprises a plurality of holes extending through said connecting collar and opening into said fluid chamber.

3. The apparatus of claim 1 wherein said inlet pipe is plugged at said leading end thereof and incorporates a plurality of openings extending through the pipe wall and opening within said valve body.

4. The apparatus of claim 1 wherein said second spheroid includes a forward portion which folds over for contacting and hermetically sealing about said valve seat.

5. The apparatus of claim 1 wherein said second spheroid collapses inwardly upon inward axial movement of said inlet pipe forming a plurality of flutes about said second spheroid for channeling fluid to said outlet pipe.

6. The apparatus of claim 1 wherein said valve seat comprises a premolded spheroid truncated at one end thereof defining an opening and valve seat surface for sealing engagement with said second spheroid of said valve body.

7. The apparatus of claim 4 wherein said second spheroid of said valve body is inverted upon inward axial movement of said valve seat to close said opening means and thereby bidirectionally sealing said valve apparatus.

* * * * *